United States Patent
Reid et al.

[11] 3,807,701
[45] Apr. 30, 1974

[54] POLYMER SOLUTION PREPARATION SYSTEM

[75] Inventors: George Reid, Olympia Fields; Edwin T. Sortwell, Wheaton, both of Illinois

[73] Assignee: Nalco Chemical Company, Chicago, Ill.

[22] Filed: Nov. 12, 1971

[21] Appl. No.: 198,120

[52] U.S. Cl. .................................................. 259/4
[51] Int. Cl. ............................................. B01f 7/08
[58] Field of Search ..................... 259/4, 7, 8, 2, 23, 259/24, 18, 36, 43, 44; 23/252, 285

[56] References Cited
UNITED STATES PATENTS

| | | | |
|---|---|---|---|
| 3,056,661 | 10/1962 | Breer | 23/285 |
| 3,123,342 | 3/1964 | Little | 259/23 |
| 3,164,374 | 1/1965 | Ralph | 259/8 |
| 3,265,365 | 8/1966 | Ward | 259/8 |

Primary Examiner—Robert W. Jenkins
Attorney—John G. Premo et al.

[57] ABSTRACT

A polymer solution preparation system for proportionally adding a polymer-containing emulsion to water containing a surfactant to invert the emulsion and release the polymers into the water as a solution including a mixing tank and a holding tank together with pumps for pumping predetermined amounts of polymer-containing emulsion and surfactant into the mixing tank and mixing same with a predetermined quantity of water to produce the polymer solution that is then transferred to the holding tank. Instrumentation is provided for automatically batching the polymer solution in the mixing tank and transferring the solution to the holding tank so that a solution supply is maintained in the holding tank for feeding a liquid system.

9 Claims, 3 Drawing Figures

POLYMER SOLUTION PREPARATION SYSTEM

This invention relates in general to a polymer solution preparation system which adds a polymer-containing emulsion to water containing a proportionally added surfactant to invert the emulsion and release the polymers into the water, and more particularly to an automatic liquid polymer preparation system that automatically prepares polymer solution and maintains it in readiness for use in a liquid system.

Water-soluble polymers in aqueous solution, which exhibit thickening and flocculating properties are utilized in various liquid systems such as, for example, in the clarification of aqueous solutions, in papermaking operations, in the treatment of sewage and industrial wastes, as stabilizers for muds, and in the secondary recovery of petroleum by waterflooding.

Although these polymers are most often available commercially as powders or as a finely-divided solid, they are most frequently utilized as aqueous solutions. This necessitates that the solid polymer material be dissolved in water. While the various polymers are more or less soluble in water, difficulty is often experienced in preparing aqueous polymer solutions because of their slow dissolution and because the solid polymer is not readily dispersible in water. Furthermore, dispersion of solid polymers in water is hindered by their tendency to clump or remain as agglomerates on contact with water. Lumps of solid polymer immediately form by the encapsulation of undissolved solids in an outer coating of water-wet polymer which retards the penetration of additional water into the agglomerate. Although many of these lumps are eventually dissolved by continued agitation, is is frequently impractical to agitate the solution for a sufficiently long period to obtain complete dissolution. Accordingly, a liquid polymer is easier and more efficient to handle.

The polymer solution preparation system of the invention automatically prepares and maintains a polymer solution by adding a polymer-containing emulsion to water having a surfactant in a mixing tank, and maintaining it in readiness for use as needed. The system includes a mixing tank into which a controlled amount of water is fed together with a metered amount of polymer-containing emulsion and surfactant, all of which are thoroughly mixed together to produce a polymer solution that is conveyed to a holding tank, from which the polymer solution is taken as needed to its point of use. The holding tank is divided into two compartments by means of a dual filter wall, where the solution enters one compartment from the mixing tank, is filtered to the other compartment by the filter wall, and taken from the second compartment to be used in a liquid system. Instrumentation is provided for automatically controlling the preparation of polymer solution in the mixing tank, and for automatically maintaining a predetermined level of polymer solution in the holding tank.

It is therefore an object of the present invention to provide a polymer solution preparation system for automatically preparing and maintaining a polymer solution in readiness for use.

Other objects, features and advantages of the invention will be apparent from the following detailed disclosure, taken in conjunction with the accompanying sheets of drawing, wherein like reference numerals refer to like parts, in which.

Figure 1:
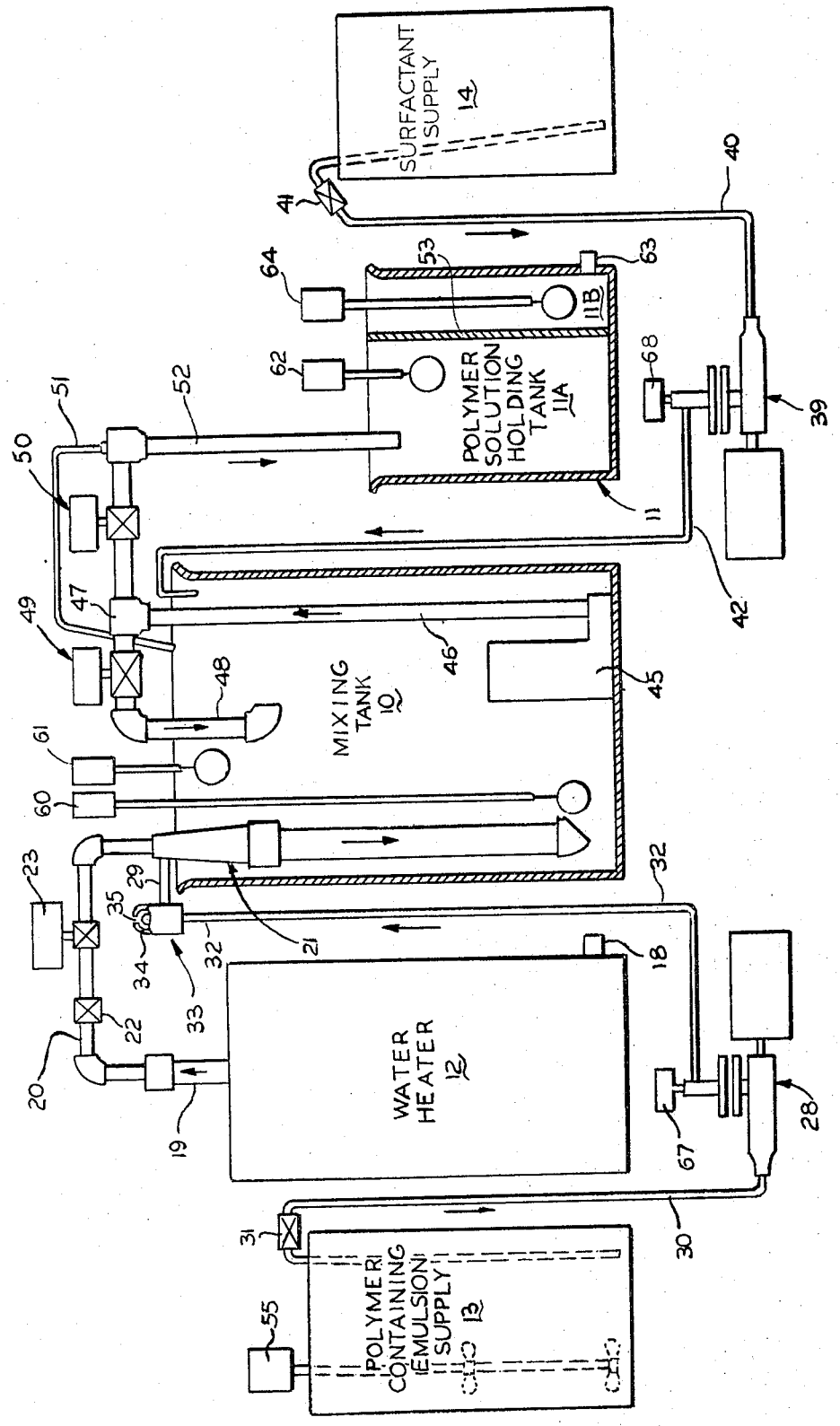
FIG. 1 is a diagrammatic view of the feeder system components.

Referring now to the drawings, and particularly to FIG. 1, the polymer solution preparation system of the invention includes generally a mixing tank 10 into which water, polymer containing emulsion and surfactant are fed proportionately for mixing to invert the emulsion and provide the desired polymer solution, a holding tank 11 into which the polymer solution is delivered for holding purposes and readiness for use as needed in a suitable liquid system, a water heater 12 for heating the water supplied to the mixing tank to a desired temperature, a polymer-containing emulsion supply tank 13 which could be in the form of a drum or the like which when empty is replaced by a full drum and from which the emulsion is metered into the mixing tank 10, and a surfactant supply tank 14 which also could be in the form of a drum or the like, and from which surfactant is metered into the mixing tank 10. Water is supplied to the water heater through a water inlet 18, it being appreciated that the inlet would be connected to a suitable pressurized supply of water. Following heating of the water in the heater 12, the heated water is discharged through a water outlet 19 into a line 20 that connects to an eductor 21 arranged within the mixing tank 10. A flow control valve 22 is provided in a line 20 to give a desired rate of water flow into the mixing tank. Control of water flow into the mixing tank is accomplished by the motor operated valve 23. The operation of the valve 23 in connection with the automatic batching liquid polymer will be explained hereinafter in connection with describing the overall operation of the system.

Polymer-containing emulsion is supplied to the mixing tank 10 through the eductor 21. A polymer-containing emulsion pump 28 meters the emulsion to the eductor emulsion inlet 29, where vacuum pressure generated by the water driven through the eductor sucks the emulsion into the eductor. The emulsion pump is connected at its inlet to the emulsion supply tank 13 through line 30 in which a check valve 31 is provided to allow emulsion flow in one direction toward the pump. The discharge of the emulsion pump 28 is connected to the emulsion inlet 29 through a line 32 in which is provided a check valve 33 that prevents emulsion from being sucked into the inlet 29 by the vacuum pressure of the eductor when the pump 28 is off by allowing air to be drawn through the check valve. The check valve includes a ball closure member 34 which is normally in open position, and which will close against a seat 35 in the event that the emulsion pump is running and the eductor is off so as to prevent the pumping of emulsion through the valve. The eductor also serves to initiate a mixing action between the polymer-containing emulsion and the water, as it is delivered into the mixing tank 10.

The surfactant is metered to the mixing tank 10 by the pump 39, the inlet of which is connected to the surfactant supply tank 14 by a line 40 having a check valve 41 therein to permit flow only into the pump, and the discharge of which is connected to the upper end of the mixing tank 10 by a line 42. The amount of time the pump is on determines the proportion of the surfactant delivered to the tank.

Mixing of a batch of solution in the mixing tank 10 is accomplished by operation of the mix and transfer pump 45, which has its suction side communicating with the interior of the tank and its discharge side connected to a pipe 46 having a tee 47 at its upper end. The tee is connected at one side to a return or recycle line 48 having a motor control valve 49 therein which when open allows return of the solution into the mixing tank. The other side of the tee 47 is connected through a line 52 which discharges into compartment 11A of the holding tank 11. The solution is filtered by a dual filter wall 53 as it passes from unfiltered compartment 11A to filtered compartment 11B. The dual filter wall is preferably formed by a relatively fine mesh screen and a relatively coarse mesh reinforcing or supporting screen to prevent undissolved or globules of polymer particles from being discharged into a liquid system. For example, the dual filter wall may consist of a 100 mesh screen reinforced with a ¼ inch mesh screen. Two sets of filter guides (not shown) are provided so that a filter change can be made when the holding tank is partially or completely filled with solution without allowing free mixing between compartments. A motor operated valve 50 in the line 52 controls solution flow from the tee 47 to the holding tank. As will be apparent when the valve 50 is closed and the valve 49 is open, recycling of the solution in the mixing tank produces a suitable mixing action of the water and chemicals while when the valve 49 is closed and the valve 50 is open, transfer of the solution from the mixing tank to the holding tank is accomplished. The mixing cycle is timed to provide proper mixing of the batch.

A vacuum vent line 51 is connected in the line 49 to function as a syphon breaker to stop flow of solution from the mixing tank to the holding tank when the valve 50 is open and the pump 45 is stopped. When the pump is operating with the valve 50 open, a small amount of solution is pumped back into the mixing tank by the vent line 51. The vent line, therefore, prevents a syphoning action when the level of the solution in the mixing tank is higher than the discharge end of the inlet pipe 49 at the holding tank.

At start-up an air-powered drum mixer 55 is operated to mix the polymer-containing emulsion in the supply tank until it is properly mixed. The water inlet valve 23 is opened to allow heated water into the mixing tank, and at this point no chemicals are being introduced into the tank. When the water level in the mixing tank reaches a predetermined level, the surfactant pump 39 and the emulsion pump 28 are sequentially turned on to meter surfactant and emulsion into the mixing tank. At the same time, the mix and transfer pump 45 is turned on to initiate mixing action while the valve 49 is open and the valve 50 is closed. When the level of the solution in the mixing tank 10 reaches and actuates the high level float switch 61, the water supply is shut off by closing water valve 23 and mixing is continued on a timed cycle until the batch is properly mixed. The surfactant and emulsion pumps will be stopped pursuant to a timed function following the metering of a predetermined amount of surfactant and emulsion into the mixing tank. The surfactant and emulsion pumps are constant speed metering pumps so that variation of the chemical proportions can be accomplished by the time period of which the pumps are "on."

Following the appropriate mixing action, which is timed, the valve 50 is opened while the valve 49 is closed to accomplish the transfer of the solution into the holding tank 11. Thereafter, continued operation of the mixing and transfer pump accomplishes the transfer of the solution. A high level float switch 62 in compartment 11A of the holding tank maintains the level of solution therein within the desired limits by turning the transfer pump on and off. Polymer solution is delivered from compartment 11B of the holding tank to its place of use through the outlet 63. Should the level of solution in compartment 11B of the holding tank 11 reach such a low level as to actuate the low level float switch 64, an alarm is sounded to indicate no supply to the holding tank or a plugged filter. As the level of the solution in the mixing tank reaches the low level to actuate the low level float switch 60, a recycling of the system will be accomplished to mix a new batch of solution.

In the event that no flow of polymer-containing emulsion is detected by the pressure switch 67 at the emulsion pump 28 when the pump is on, an alarm will be sounded and the system will be shut off so the problem can be diagnosed and corrected. Similarly, in the event that no flow is detected by the pressure switch 68 at the surfactant pump 69, an alarm will be sounded and the entire system will be shut off.

Figure 2A:
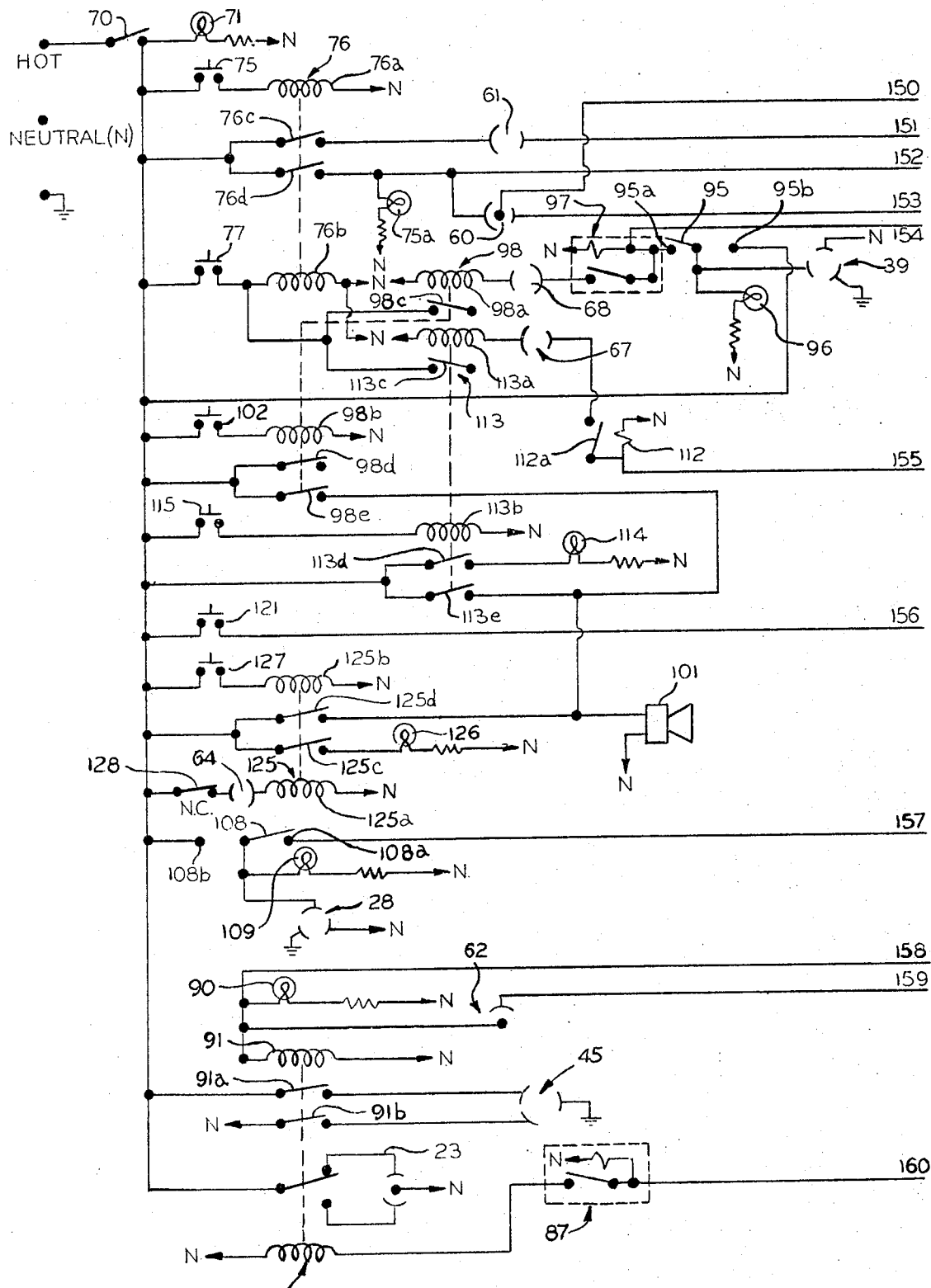
FIGS. 2A and 2B are electrical schematic diagrams of the control for operating the system.
Figure 2B:
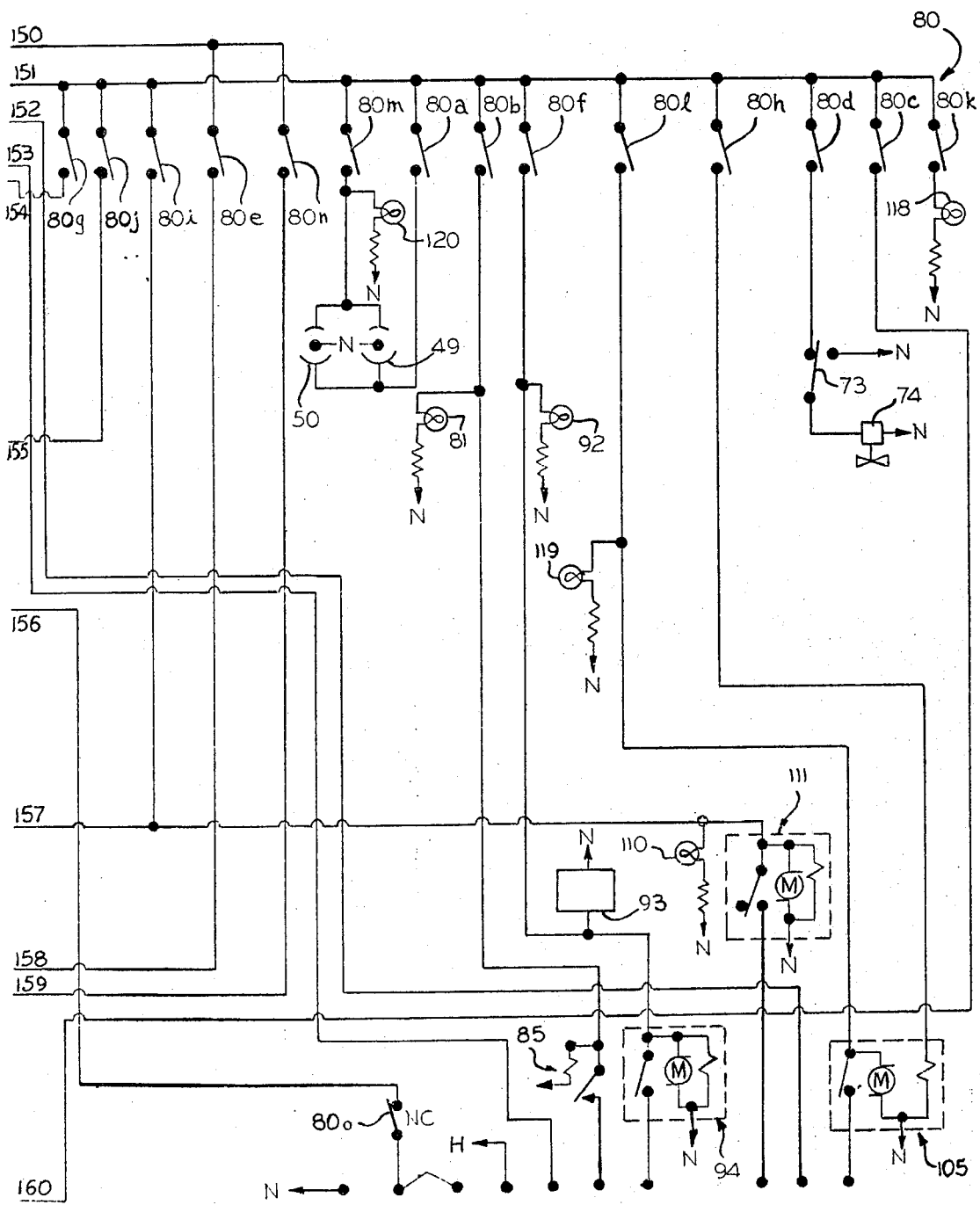

The control circuitry for automatically operating the system is shown in FIG. 2. The heart of the control circuitry includes a stepping switch 80 having six steps, which upon signal, sequentially advances through its steps by the completion of certain operations of the system to prepare a batch of solution, and thereafter recycles when necessary to advance again through the six steps. The stepping switch includes normally open contacts 80a–80n and normally closed contacts 80o. In this respect, the holding tank has a much larger capacity than the mixing tank, so that the supply in the holding tank is always maintained in readiness for use. The closing of the main power switch 70 readies the control circuitry for operation, and as such energizes a "power on" pilot light 71. Manual closing of switch 73 operates a solenoid valve 74 to drive the drum mixer 55 when placing a new drum in the system, so that the emulsion is properly mixed and ready for use with automatic operation of the system.

Automatic operation of the feeder to commence a batch producing operation is initiated by manually depressing the automatic start button 75 which energizes the latch coil 76a of latching relay 76 to close contacts 76c and 76d. The system may be stopped at any time by manually depressing stop switch 77. Closing of contact 76c connects power to the stepping switch 80 which would be in step or position one, while closing of contact 76d energizes the "automatic on" pilot light 75a. At this point, the transfer valve 50 is closed while the mixing valve 49 is open. In position one, normally open contacts 80a–80d are actuated and therefore closed while the other normally open contacts remain open. Closing of stepping switch contacts 80b energizes the "step one" pilot light 81 to indicate that the system is in the first step of its cycle in preparing a batch of polymer solution. At the same time, the closed contacts 80b initiate operation of time delay switch 85, which when timed out advances the stepping switch to "step two," to permit the addition of water to the mixing tank prior to the addition of chemicals, thereby attaining a certain water level in the tank before adding chemicals. Closed stepping switch contacts 80c operate the water inlet valve 23 and open same to allow water to be added to the mixing tank 10 at a controlled rate. Closing of contacts 80d actuates the solenoid valve 74 to start the drum mixer 55. The motor operated valve 23 is given a signal to move to open position by the energization of the relay 86 following the timing out of a time delay switch 87. The time delay switch 87 merely prevents back feed from signalling operation to the valve 23 by allowing about a 2-second delay before energizing the relay 86. The time delay switch 87 together with the time delay switch 85 are of a suitable bimetallic type. The water valve 23 is of a type that moves to open or closed position upon receiving an electrical signal and is stopped in open or closed position by the actuation of internal limit switches. Accordingly, when a signal is delivered to the water valve, it will move to the opposite position. Timing out of the time delay switch 85 closes its contacts to advance the stepping switch to step two.

In step two, contacts 80a, 80c, 80d, 80e, 80f, 80g, and 80h are closed. Likewise contacts 80b which were closed in step one, will open. Maintaining contacts 80a closed maintains the mixing valve 49 open, and the transfer valve 50 closed. Maintaining contacts 80c closed maintains water valve 23 open, while maintaining the contacts 80d closed maintains the drum mixer 55 in operation. The closing of contacts 80e energizes the "mixer on" pilot light 90, and actuates the mix and transfer pump relay 91 to close contacts 91a and 91b and turn on the mix and transfer pump 45. Closing of contacts 80f energizes the "step two" pilot light 92, actuates a batch counter 93 to count the batch being made, and turns on the surfactant timer 94. Closing of contacts 80g turns on the surfactant pump 39, it being appreciated that a selector switch 95 is in position 95a, which is automatic, the position 95b permitting manual operation of the surfactant pump to prime it prior to start-up. The "surfactant on" pilot light 96 is energized by the closing of contacts 80g, as is a time delay switch 97. The switch 97 has a time delay of about 5 seconds, and will thereafter close, and in the event that no pressure is detected by the normally closed pressure switch 68 at the end of the time out of timer 97, the closing of timing switch 97 operates the latch coil 98a of relay 98 to close contacts 98c, 99d and 98e to unlatch relay 76 by energizing unlatch coil 76b through closing contacts 98c, to energize the "surfactant no-flow" pilot light 100 through closing contacts 98d, and to turn on the alarm 101 through closing contacts 98e. The alarm may be in the form of a horn or the like. Unlatching relay 76 turns off the system except for the alarm. This indicates the surfactant no-flow condition needs prompt attention. The alarm can thereafter be silenced by manually depressing the surfactant no-flow silence button 102, which energizes the unlatching coil 98b of relay 98 that turns off the alarm 101. In the event that surfactant flow is detected by the pressure switch 68, the switch 68 will open and prevent energization of the alarm when the time delay switch 97 closes. Thus, there must be the combination of a closing of time delay switch 97 along with the closed surfactant pressure switch 68 before the alarm can be sounded. Closing of contacts 80h resets mix timer 105, but does not start the timer.

When the surfactant timer 94 times out upon the proper proportion of surfactant being injected into the mix tank 10, it will cause the stepping switch to advance to step three, where contacts 80a, 80c, 80e, 80i and 80j are closed. Maintaining contacts 80a closed maintains the mixing valve 49 open and the transfer valve 50 closed, while maintaining contacts 80c closed maintains the water valve 23 open. Closed contacts 80e maintain the mix and transfer pump on. Closing of contacts 80i energizes the emulsion pump 28 to commence the addition of polymer-containing emulsion to the mix tank 10. It will be noted that the selector switch 108 will at this time be in contact with contacts 108a, which is the automatic cycle of the system, and which will cause the "emulsion on" pilot light 109 to be energized, and indicate the emulsion pump is on. The selector switch 108 can be manually positioned to engage contacts 108b for start up to prime the emulsion pump. The closing of contacts 80i also energizes the "step three" pilot light 110, and the emulsion pump timer 111. Closing of contacts 80j starts time delay switch 112 which upon timing out closes its contacts 112a, and in the event that a no-flow condition is detected by the pressure switch 67 which is normally closed, the latching coil 113a of relay 113 will be energized to close contacts 113c, 113d and 113e to turn on the "emulsion no-flow" pilot light 114 through contacts 113d and the alarm 101 through contacts 113e. The contacts 113c energize unlatch coil 76b of relay 76 to unlatch same and turn off the system except for the alarm. Unlatching of the relay 113 by energizing the unlatch coil 113b following the manual closing of the "emulsion no flow silence" switch 115 cases the alarm to stop. In the event that a flow condition is detected, the emulsion pressure switch 67 will open and prevent energization of the alarm 101. Upon the timing out of the emulsion timer 111 when the proper emulsion proportion is in the mix tank, the stepping switch 80 will advance to step four. It will be appreciated that those contacts closed in step two and not mentioned as being closed in step three will be open during the time the stepping switch 80 is in step three.

In step four of the stepping switch 80 the contacts 80a, 80c, 80e and 80k are closed. Maintaining of contacts 80a closed maintains the mixing valve 49 open and the transfer valve 50 closed, while maintaining of contacts 80c closed maintains the water valve 23 open, so the supply of water continues to the eductor 21 and the mixing tank 10. Maintaining the contacts 80e closed maintains the mix and transfer pump 45 in operation to continue the mixing of the solution in the tank. Closing of contacts 80k energizes the "step four" pilot light 118. When the solution level in the mixing tank 10 rises to close the high level float switch 61 which is normally open, a signal is sent to the stepping switch 80 to advance it to step five.

In step five, contacts 80a, 80e and 80l are closed, the other contacts being open. Maintaining contacts 80a closed maintains the mixing valve 49 open and the transfer valve 50 closed, while maintaining contacts 80e closed maintains the mix and transfer pump in operation to continue the mixing operation within the mixing tank. Closing of contacts 80l energizes the "step five" pilot light 119, and brings the mixing timer 104 into the circuit, and when the mixing cycle times out, a signal will be sent to the stepping switch 80 to advance it to step number six. In step five the water valve 23 is closed by the opening of contacts 80c.

In step six, the stepping switch 80 causes closure of contacts 80m and 80n, and opening of contacts 80o, while the other contacts of the stepping switch are opened. Opening of contacts 80e takes the operation of the mix and transfer pump out of the stepping switch. Closing of contacts 80m causes opening of the transfer valve 50 and closing of recycling or mixing valve 49 as well as to energize the "step six" pilot lamp 120 so that solution can be transferred to the holding tank. Closing of contacts 80n turns the operation of the mix and transfer pump 45 over to the high level float switch 62 in the holding tank, which maintains the level in the holding tank at a predetermined point during usage of polymer solution. For example, the switch 62 may open at the top end of a given travel, such as 2 ½ inches to turn off the transfer pump 45 and stop transfer of solution into the holding tank, and close at the bottom end of the given travel to turn on the pump and cause further transfer of the solution into the holding tank to maintain a desired level. The opening of contacts 80o opens the line for the "program reset" button 121 to stop the stepping switch in step six should the button 121 be manually depressed in the event of an alarm condition necessitating interruption of the batching cycle. Thereafter, draining of the mixing tank and activation of the low level float switch 60 will cause the stepping switch to advance to step one and commence making a new batch.

The system will recycle automatically to prepare a successive batch upon dropping of the solution level in the mixing tank below the low level float switch 60, thereby causing the stepping switch 80 to advance to step one.

In the event that the level in filtered compartment 11B of the polymer solution holding tank 11 falls to a level which activates the low level float switch 64, such will energize latching coil 125a of relay 125 to close contacts 125c and 125d for energizing a "low level filtered solution" pilot lamp 126 and the sounding alarm 101 indicating no further supply of solution to the holding tank or a plugged filter. The alarm can be silenced by depressing low level silence switch 127, which actuates the unlatch coil 125b of the relay 125 to open the contacts 125c and 125d, thereby silencing the alarm 101. A normally closed disconnect selector switch 128 may be selectively opened to disable the low level float switch 64 if so desired.

During the batching cycle, an initial water fill of the mixing tank is concluded in step one. A measured amount of surfactant is introduced into the mixing tank in step two, while a measured amount of polymer-containing emulsion is introduced with water through the eductor in step three. The final water fill is concluded in step four, while a final timed mixing cycle of the full quantities of water, surfactant and polymer-containing emulsion is conducted in step five. In step six, the polymer solution is transferred from the mixing tank to the holding tank. The batching cycle is repeated as dictated by the needs of the liquid system being supplied.

It will be understood that modifications and variations may be effected without departing from the scope of the novel concepts of the present invention, but it is understood that this application is to be limited only by the scope of the appended claims.

The invention is hereby claimed as follows:

1. A polymer solution preparation system comprising a mixing tank for mixing proportionate amounts of polymer-containing emulsion, surfactant and water to prepare a batch of liquid polymer solution of predetermined quality, a holding tank for holding polymer solution and from which polymer solution is drawn to be used in a liquid system, a polymer-containing emulsion supply means for supplying a predetermined amount of emulsion to the mixing tank, a surfactant supply means for supplying a predetermined amount of surfactant to the mixing tank, a water supply means for supplying a predetermined amount of water to the mixing tank, means in the mixing tank for mixing the polymer-containing emulsion, surfactant and water to produce the batch of polymer solution, means for transferring the solution from the mixing tank to the holding tank, and electrical cycling means controlling the operation of the system to prepare a batch.

2. The combination as defined in claim 1, wherein said polymer-containing emulsion supply means includes a pump metering emulsion to the mixing tank and timing means to control operation of the pump and therefore the quantity of polymer-containing containing solution going into the mixing tank.

3. The combination as defined in claim 2, wherein said surfactant supply means includes a pump metering surfactant to the mixing tank and timing means to control operation of the pump and therefore the quantity of surfactant going into the mixing tank.

4. The combination as defined in claim 3, wherein said water supply means includes a pressurized source of water, a flow control valve, and a shut-off valve, whereby the time the shut-off valve is open determines the quantity of water going into the mixing tank.

5. The combination as defined in claim 4, and means for detecting no flow conditions in the emulsion pump and shutting the electrical cycling means down and sounding an alarm.

6. The combination as defined in claim 5, and means for detecting no flow conditions in the surfactant pump and shutting the electrical cycle means down and sounding an alarm.

7. The combination as defined in claim 6, wherein said mixing and transfer means includes a pump in the bottom of the mixing tank having the suction side in communication with the tank contents, a main conduit connected to the discharge side of the pump, a return conduit connected to the main conduit and returning to the mixing tank and a transfer conduit connected to the main conduit going to the holding tank, a mixing shut off valve in the return conduit, and a transfer shut off valve in the transfer conduit.

8. The combination as defined in claim 7, and said electrical cycling means including high and low level float switches for said mixing and holding tanks.

9. The combination as defined in claim 8, wherein said mixing tank includes first and second compartments separated by a filter, the first compartment receiving the solution from the mixing tank and the second compartment from which filtered solution is taken by a liquid system.

* * * * *